June 9, 1959  C. A. NORTON  2,890,331
PHASE COMPARATOR
Filed April 21, 1954  2 Sheets-Sheet 1

INVENTOR.
CLYDE A. NORTON
BY
John L. Sterling
ATTORNEY

June 9, 1959  C. A. NORTON  2,890,331
PHASE COMPARATOR
Filed April 21, 1954  2 Sheets-Sheet 2

INVENTOR.
CLYDE A. NORTON.
BY
J. C. Sterling
ATTORNEY

United States Patent Office 2,890,331
Patented June 9, 1959

2,890,331

PHASE COMPARATOR

Clyde A. Norton, Glen Mar Park, Md.

Application April 21, 1954, Serial No. 424,634

20 Claims. (Cl. 250—27)

This invention relates to a method and apparatus for determining the phase difference between a pair of alternating voltages, and in certain of its aspects, contemplates a circuit for delivering a direct current or voltage, the magnitude of which is a function of the phase angle between the reference voltage and a voltage subject to phase shift with respect to the reference voltage.

In another of its aspects, it relates to a circuit or circuits for producing a direct current or voltage, the magnitude of which is a function of the phase angle between the reference voltage and the shifting voltage and the sign of which is + or — depending on whether the shifting voltage lags or leads the reference voltage.

As an example, supposing the shifting voltage to be originally 90° leading the reference voltage and to gradually drop back until it lags the reference voltage by 90°, the circuit will provide a D.C. voltage which is a maximum for the 90° lead and has, for example, a positive sign. As the shifting voltage progressively changes its phase compared to the reference voltage and comes into phase with the reference voltage, the D.C. voltage will progressively drop from maximum to zero, as a function of the phase difference, and will be zero when the voltages are in phase. If the shifting voltage now further shifts to lag 90°, the D.C. voltage will rise in the negative direction proportional to the phase angle and will reach a maximum at 90°.

Circuits of this nature are capable of use in many different applications. For example, suppose it is desired to keep two oscillators running in synchronism. The circuits here described will provide a voltage proportional to the angle of lag or lead between the two output voltages, which can be applied to a correcting circuit so that when the shifting oscillator tends to go out of synchronism, (which will first be apparent as a phase shift between the two output voltages) the correcting voltage may operate in a number of known ways in a sense to counteract the departure from synchronism.

A more specific example of this is, for example, in television systems wherein it is desired to have a cathode ray beam in the receiver following exactly the excursion of the cathode ray beam at the transmitter. In such case, the excursion at the transmitter would be indicated by a synchronizing voltage transmitted to the receiver. The excursion of the cathode ray beam at the receiver would be similarly indicated by a voltage generated by the excursion, and the two voltages representing the two beam excursions would be supplied to the circuits, hereinafter described, to obtain a correction voltage which would be proportional to the departure of the beam in the receiver from its desired instantaneous position, and may be used to apply the necessary correction to hold the beam at all times in its desired position.

Other applications and uses for the apparatus herein described will be apparent to those skilled in the art and it is not believed necessary here to mention such uses.

It is an object of this invention to provide a method and apparatus for the phase comparison of two alternating voltages of the same frequency and to provide a voltage, the magnitude of which is proportional to the phase difference between such voltages.

It is a further object of this invention to provide a method and apparatus for producing such a voltage, the sign of which is + or —, depending on whether the shifting voltage lags or leads the reference voltage.

It is still a further object of this invention to provide relatively simple and reliable circuits for the purpose described and in which the circuits do not react one upon the other, that is to say, circuits in which the variables in one circuit may be adjusted without causing disturbances in the operation of associated circuits not intended to be changed by the adjustment.

The features of novelty which I believe to be characteristic of my invention are set forth with particularity in the appended claims. My invention itself, however, both as to its fundamental principles and as to its particular embodiments, will best be understood by reference to the specification and accompanying drawing in which:

Referring now more particularly to Figs. 1, 2 and 3, 10 and 11 indicate two oscillator systems or alternating current generators generating two alternating current voltages of the same frequency. The oscillators or generators which it is desired to maintain in synchronism not only as to frequency but as to phase may be located in proximity or at a distance from each other. For example, conductors 1 and 3 may supply one alternating current voltage and conductors 2 and 4 the other. These voltages may have a phase difference indicated by the angle $\phi$ in Fig. 2, which may vary through 360° or multiples thereof or through only a part of 360°. It will be understood that the apparatus herein is incapable of distinguishing between phase differences involving multiples of 360° and is limited to determining phase angles, in one instance, between zero and 180°, in which case the readings are unambiguous, or in another embodiment between +90° and —90° in which the readings are also unambiguous.

Figure 1:
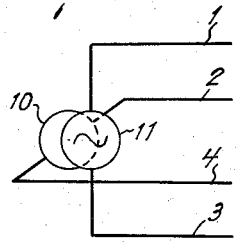
Figs. 1, 2 and 2a are diagrammatic figures referred to in explaining the operation of the invention herein.
Figure 2:
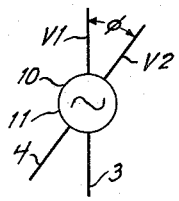
Figure 2A:

To determine the angle $\phi$ accurately without the masking effect of other variables, voltages 1—3 and 2—4 are assumed to be equal and to be represented by vectors $V_1$ and $V_2$, as in Fig. 2a, one lagging the other by angle $\phi$. While either voltage may be considered the reference voltage and the other the shifting voltage, it is here, for convenience of reference, considered that $V_1$ is the reference voltage and in accordance with convention, the vectors rotate counterclockwise and the voltage $V_2$ is shown as lagging the reference voltage $V_1$.

It will be understood that conditions which may cause the two oscillators to go out of synchronism will first cause a change in phase, i.e., an increasing angle of lag or lead as the case may be, and if this is allowed to continue uncorrected, the result will ultimately be a departure in frequency of one from the other.

Figure 3:
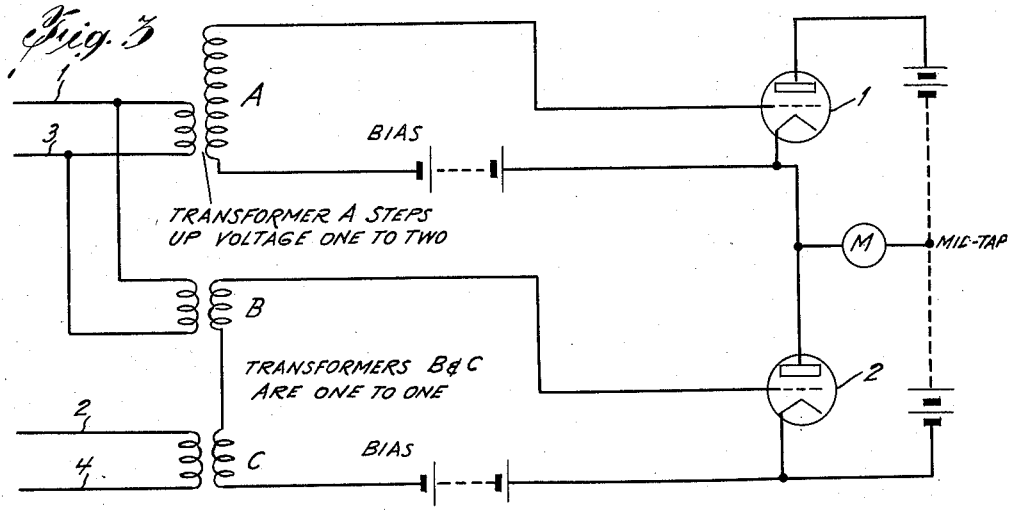
Fig. 3 is a circuit diagram of one form of apparatus in accordance with my invention.

Referring now more particularly to Fig. 3, lines 1—3 and 2—4 supply the two voltages $V_1$ and $V_2$ respectively. These lines terminate in transformers A, B, and C, the primary of transformer B being connected in parallel with the primary of transformer A, so that the voltage 1—3 is supplied to the secondaries of transformers A and B. The line 2—4 terminates in the primary of transformer C which is supplied with the voltage of lines 2—4.

Transformer A is a step-up transformer having a one-to-two step-up, i.e., twice as many turns on the secondary as on the primary, whereas transformers B and C are one-to-one transformers, i.e., having the same number of secondary turns as primary turns. The triodes 1 and 2 are provided with a connection from the anode of triode 2 to the cathode of triode 1. Plate voltage is supplied by a connection from the negative side of the power supply to the cathode of triode 2 and from the positive side thereof to the anode of triode 1. While indicated by the convention for a battery, the power supply may actually be a conventional rectifier and filter system as used in radio and television receivers, if desired; or it may even be alternating current, in which case space current will flow in the tubes only during the half cycle when the anode of 1 is positive with respect to the cathode of 2.

A connection is provided from the midpoint of the power supply through a meter M, which may be an ammeter or a voltmeter connected across a suitable resistance to the connection between the anode of tube 2 and the cathode of tube 1. The control electrode or grid of tube 1 is connected through the secondary of transformer A and through a suitable source of biasing potential to the cathode of triode 1. The control electrode, or grid of triode 2, is connected through the secondaries of transformers B and C in series, thence through a suitable source of biasing potential to the cathode of triode 2. The biasing potentials are so chosen, with reference to the voltage swings applied to the grid, to maintain the tubes at all times on the linear portion of the grid-voltage-plate current characteristics; i.e., between the upper and lower knees of the curve.

Triodes 1 and 2 are preferably chosen to have as nearly identical characteristics as may be; that is to say, they should draw the same plate current at the same grid voltage. It will be noted that the connection is essentially that of the Edison three-wire system, in that the plate current of triode 2 flowing through meter M is opposite in direction to the plate current of the triode 1 flowing through the meter. If the tubes are closely matched and the voltages applied to the two grids are equal in amplitude and the two voltages 1 and 3 and 2 and 4 have zero degrees phase difference, then the current shown by meter M will approach closely to zero. This is the desired condition for adjusting the circuit for operation.

It will now be noted that although only one voltage is applied to triode 1, it is applied through the transformer A, which has a one-to-two step-up ratio, and, therefore, if the voltages are in phase, i.e., $\phi=0$, the voltage between cathode and grid of triode 1 will be equal to the voltage between the cathode and grid of triode 2, this giving rise to the desired minimum current through meter M. Should now $\phi$ equal a finite value, less than 180°, either lagging or leading, the voltage applied to the control circuit of tube 2 will be the vector sum of the voltages 1—3 and 2—4 and this vector sum will always be less than twice either voltage. This will cause one of the tubes to draw a current in its plate circuit different from that of the other tube and the current through the meter M will increase to a maximum when $\phi=180°$, since under those conditions the voltages appearing across the secondaries of transformers B and C are equal and opposite and effectively cancel each other out, leaving only the bias voltage applied to the grid of tube 2.

It has been found that the meter readings are proportional to the phase angle $\phi$ within the limits from zero to 180° in the circuit shown and it then becomes possible to calibrate the meter M in terms of phase angle. This may best be done by employing a signal generator, a phase shifting network and a precision phase meter to measure the phase angle $\phi$ between the voltages on lines 1—3 and 2—4. With such an arrangement the circuit may be calibrated by introducing known increments of phase shift from zero to 180° and noting the deflections of the meter M.

It will also be noted that to obtain accurate readings, the amplitude of the voltages 1—3 and 2—4 must not only be equal to each other, but must be held constant; that is to say, a calibration made for voltage swings of 20 volts peak-to-peak would not necessarily be correct for voltage swings of 40 volts peak-to-peak; in fact, the circuit is amplitude sensitive and ordinarily, if calibrated at one level of voltage, must be used at that level if accuracy is to be realized.

In the construction or choice of the transformers A, B, and C, if the circuit is to be used at audio frequencies or relatively low radio frequencies, iron core transformers may be employed. However, if the circuit is to be used at relatively high frequencies, it is desirable to avoid the use of iron and to use air core transformers. Similarly, unless excessively high frequencies are to be employed, tubes 1 and 2 may be ordinary triodes, but by using special types of tubes such as the so-called "light house" tube, the upper frequency range may be extended and even beyond this range velocity modulated tubes may be employed, if desired, although ordinarily they will not be necessary because the transformers themselves will determine the upper limit of frequencies to which the circuit will respond accurately.

To measure phase angle between voltages of the same frequency, but of different amplitudes, the two voltages must first be made equal, because otherwise the amplitude differences will cause spurious readings on the meter indicating an incorrect phase. For instance, with both voltages in phase but of unequal amplitude the meter will not read zero.

Figure 4:
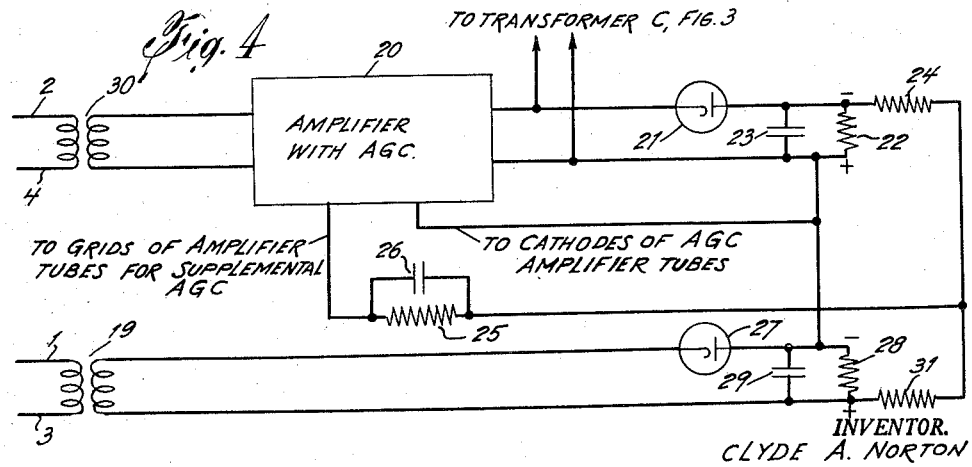
Figs. 4 and 5 are circuit diagrams of modified forms of the invention herein.
Figure 5:
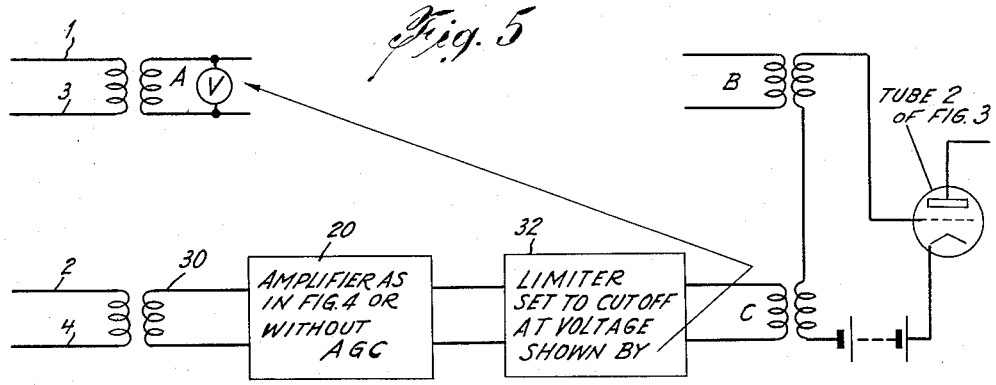

To make the voltages equal in amplitude, the weaker voltage, say, 2—4, is amplified in an amplifier having automatic gain control as in Fig. 4 or Fig. 5. In the circuit of Fig. 4, the voltage across lines 1—3 is fed through transformer 19 and rectified by diode 27, the output circuit of which contains the shunt resistor 28 shunting condenser 29. As indicated on the drawing, the rectified voltage will be in the sense indicated; the negative point at the top and the positive point at the bottom.

The smaller voltage, assumed to be on lines 2—4, is applied through transformer 30 to amplifier 20 provided with any well-known automatic gain control circuit. The output of this amplifier is rectified in diode 21 in the plate circuit of which is resistor 22 shunted by condenser 23. The sense of the rectified voltage appearing across resistor 22 is the same as in resistor 28, with the negative at the top and the positive at the bottom.

The negative point of resistor 22 is connected through series resistances 24 and 31 to the positive terminal of resistor 28 and the negative terminal of resistor 28 is connected to the positive terminal of resistor 22 and from this common point of resistors 22 and 28 a connection is made to the cathodes of the automatic gain control amplifier tubes in amplifier 20. A connection is also made from the common point of resistors 24 and 31 through resistor 25 shunted by condenser 26 to the automatic gain control voltage line of the amplifier 20, and thus to the grids of the AGC amplifier tubes in amplifier 20. This connection should be made to the automatic gain control bus in amplifier 20 in a manner to add the resultant IR drop through resistors 22 and 28 in series with any other grid voltage, for instance, by opening the AGC bus leading from grids to cathodes and connecting the left hand terminal of resistor 25 to the grid side of the opened bus, and the common point of resistors 22 and 28 to the cathode side of the opened bus.

The operation of the circuit thus far described is that voltages 1—3 and the output of the amplifier are rectified and the rectified voltages bucked, as shown, and the resultant difference voltage is applied as a supplemental AGC voltage. When the voltage at the output of the amplifier is equal to the voltage 1—3, no voltage is obtained from the bucked rectified voltages and the amplifier output stays constant. If the output of the amplifier drops, the bucked voltage output becomes positive and increases the gain of the amplifier. If the amplifier output gets too high the bucked output voltage becomes negative and reduces the gain of the amplifier; thus the circuit operates to give a voltage derived from lines 2—4; which remains constant and equal to 1—3 in spite of fluctuations in amplitude of 2—4. The connections shown on the diagram at the output of the amplifier 20 labeled "to transformer C, Fig. 3" will be understood to be the connections feeding the primary of transformer C of Fig. 3. Transformers A and B, Fig. 3, will be fed as before.

To provide further assurance against too great amplification of voltage 2—4, a limiter 32 may be applied in series with the output of the amplifier 20, as shown in Fig. 5. This limiter may be of any well-known type and it is, therefore, not believed necessary to describe it in detail. In adjusting the limiter, it will be set to cut off at, or very slightly above, the voltage shown across the secondary of transformer A and the transformer C of Fig. 3 will draw its voltage from the output of the limiter 32, which in turn stands guard over the output of amplifier 20. It should be noted, however, that careful adjustment of the amplifier should be made and reliance should not be placed on the limiter to do the entire job, because if the sine wave is cut substantially below the apex the wave form will be distorted and spurious readings may be introduced thereby.

Figure 6:
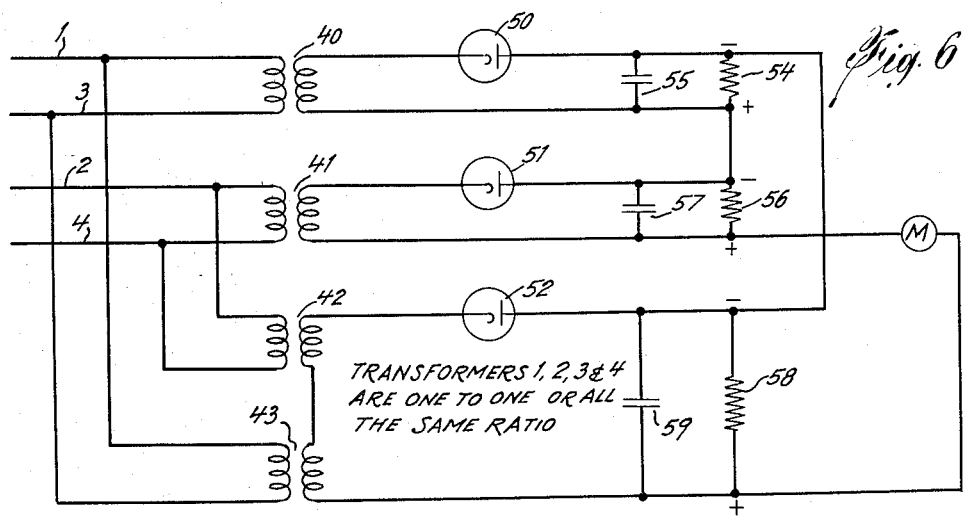
Fig. 6 is a circuit diagram of still another form of apparatus, according to the invention.

Referring now more particularly to Fig. 6, I have shown still another embodiment of the invention, in this instance, employing diodes instead of triodes and also employing an additional transformer. Transformer 40 has its primary connected across lines 1—3 and its secondary feeds diode rectifier 50, having in its plate circuit resistance 54 shunted by condenser 55. Transformer 41 is supplied from lines 2—4 and its secondary feeds diode 51 similarly having resistance 56 shunted by condenser 57 in its anode circuit. Lines 2—4 also feed transformer 42, the secondary of which is connected in series with the secondary of transformer 43 supplied from lines 1—3. The secondaries of transformers 42 and 43 in series feed diode 52, having in its output circuit resistance 58 shunted by condenser 59. The lower point of resistance 56 is connected through the meter M to the lower point of resistance 58 and the upper point of resistance 58 is connected to the upper point of resistance 54. Transformers 40, 41, 42 and 43 are all one-to-one or all the same step-up ratio. The values of the various resistors and condensers are so chosen that the diodes all operate as linear or peak rectifiers, and it will be noted that the IR drop from the positive terminal of resistor 56 to the negative point of resistor 54 represents the arithmetical sum of the voltages on the secondaries of transformers 40 and 41 and the IR drop from the positive terminal of resistor 58 to the negative point of resistor 58 represents the vector sum of the same voltages. The meter M reads the difference between the arithmetic and vector sums and is a function of phase when the voltages applied to the diodes are both equal and constant in amplitude. The circuits for assuring uniformity and constancy of amplitude, shown in Figs. 4 and 5 as applied to Fig. 3, may also be applied to the circuit shown in Figs. 6 and 7.

In connection with the circuit shown in Fig. 6, in lieu of using the two diodes 50 and 51 fed by two transformers 40 and 41, a one-to-two step-up transformer such as A of Fig. 3 may be employed, feeding from line 1—3 into diode 50, having resistor 54 in its plate circuit, shunted by condenser 55. In this case transformer 41, diode 51, resistor 56, and condenser 57 are omitted and the connection from the meter M which formerly was made to the + terminal of resistor 56 will be made to the + terminal of resistor 54. The circuit so modified operates exactly as before, but has the advantage of being less expensive, in that one transformer, one diode and its socket, a resistor, condenser, and some wiring is eliminated.

Figure 7:
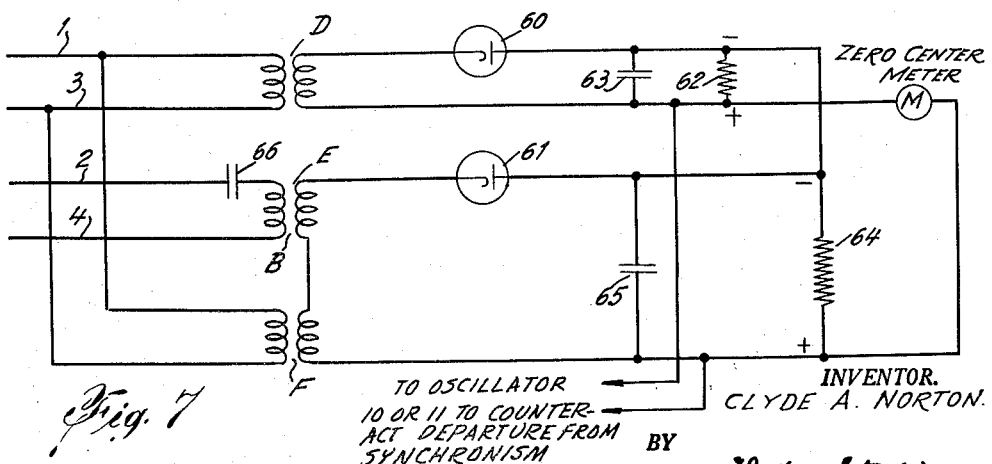
Fig. 7 is a circuit in accordance with still another and for some purposes the preferred embodiment of my invention.

Referring now more particularly to Fig. 7, I have shown a still further modification of the circuits embodying my invention and this circuit is, for some purposes, the preferred form, in that the preceding circuits will give an output voltage which is a function of the phase angle $\phi$, but they do not indicate whether the shifting voltage lags or leads the reference voltage. Such an indication is given by the circuit of Fig. 7 between the limits of 90° lag and 90° lead. In this instance, and as before, the transformer D is fed from lines 1—3 and feeds diode 60, having resistor 62 and shunt condenser 63 connected in the anode circuit. Transformer E has in series with its primary a condenser 66 which is inserted for the purpose of introducing a 90° phase shift in the voltage of transformer E. The condenser 66 could equally well be an inductance giving a 90° phase shift and/or a combination of both and which is most desirable may be determined by trial in the circuit in which it is to be used. The meter M, which is in this case a zero center volt meter, is connected to read the voltage drop between the lower point of resistor 62 and resistor 64. How the circuit operates will now be explained.

Both diodes 60 and 61 are arranged to operate as linear or peak rectifiers as is well-known in the art, and if the transformers D, E and F are all one-to-one transformers and the voltages are in phase, then the voltages in the secondaries of transformers E and F are 90° out of phase and the voltage drops through resistances 62 and 64 are equal and the meter will read zero. If, now, voltage 2—4 begins to lead voltage 1—3, the voltage drop across resistor 64 will increase and the meter will read in one direction, depending on the various connections. This reading will increase to a maximum for 90° lead. If the voltage across 2—4 begins to lag the voltage on 1—3, the voltage drop across resistance 64 will decrease and the meter will read in the other direction and will increase to a maximum for 90° lag; thus, lead will be indicated by deflections to one side of zero while lag will be indicated by deflections to the other side of zero.

It will be understood that with the circuits of Figs. 3 and 6, the output voltage for which the meter is calibrated in degrees of phase shift will rise from a minimum at 0° phase angle, to a maximum at 180° phase angle, and, if the phase difference continues to increase, will decline again from 180° to its minimum and always has the same sign, because the voltage which represents the vector sum can never exceed the voltage which represents the arithmetical sum of the voltages. Also it should be noted that, unless readings are restricted to the zone from 0° to 180°, the readings are ambiguous. Thus, the readings for 90° and 270° will be the same.

With the circuit of Fig. 7, the effect of the 90° phase displacement introduced is to shift the maximum voltage point which formerly occurred at 180°, to 90° and 270°, and in this instance readings of from 0° to 90° will be ambiguous with readings from 90° to 180°, i.e., the readings for 45° and 135° will be the same, as will the readings for 225° and 315°.

It is therefore desirable, to avoid ambiguity if only the meter is to be read, to limit its use in the circuit of Fig. 7 to phase shifts of no more than 90° lag or lead. If, however, the voltages to be compared are displayed on a cathode ray oscilloscope in such a manner that the phase angle is readily observed, it will be clear which of two possible values of phase angle should be taken. For example, with the circuit of Fig. 7, a meter reading might be such as to correspond to a phase lag of either 45° or 135°, but a glance at the oscilloscope will immediately show which is correct.

In connection with the use of an amplifier with or without AGC (automatic gain control) and/or a limiter, described with reference to Figs. 4 and 5, both of these may introduce a phase shift, which may vary at different frequencies and under different load conditions. If a high order of accuracy is desired, the phase shift so introduced by either or both should be measured under the actual conditions of use for various phase angles, and a table of corrections prepared, so that the meter readings obtained in use may be corrected for the phase shift so introduced.

An advantage of the circuits herein is that they operate under substantially open circuit conditions, and adjustments in one circuit are not reflected into other circuits. This permits adjustment of each circuit independently of others.

Heating circuits of the various tubes are indicated only diagrammatically for simplicity, since the same are well understood in the art.

It will be understood that instead of using the meter or in addition to using the meter, the voltage across the meter may be employed as a correcting voltage as indicated earlier in the specification. It will also be understood that the diodes, herein shown as thermionic vacuum tubes having a cold anode and a hot cathode, may equally well be crystal rectifiers, sometimes called "crystal diodes." All diodes shown herein are arranged to operate as linear or peak rectifiers.

While I have shown and described certain preferred embodiments of my invention, it will be understood that modifications and changes may be made without departing from the spirit and scope thereof, as will be apparent to those skilled in the art.

I claim:

1. A phase comparator comprising, in combination, means for deriving from the voltages to be compared, a first voltage which is the arithmetic sum of the voltages to be compared, means for deriving from said voltages a second voltage which is the vector sum of the said voltages, and means for determining the difference between said first and second voltages.

2. A phase comparator comprising, in combination, means for deriving from the voltages to be compared, a first voltage which is proportional to the arithmetic sum of said voltages, means for deriving from said voltages a second voltage which is proportional to the vector sum of said voltages, and means for deriving from said first and second voltages an effect proportional to the phase angle between the voltages to be compared.

3. A phase comparator for determining the phase angle between a reference voltage and a shifting voltage, comprising, in combination, means for linearly rectifying the arithmetic sum of said voltages, means for linearly rectifying the vector sum of said voltages, and means for combining said rectified voltages to produce an effect proportional to the phase angle between the voltages to be compared.

4. A phase comparator for determining the phase angle between a reference voltage and a shifting voltage, comprising, in combination, means for deriving from said voltages a first effect proportional to the arithmetic sum of said voltages, means for deriving from said voltages a second effect proportional to the vector sum of said voltages, and means for comparing said first and second effects to produce a third effect proportional to the phase angle between the reference voltage and the shifting voltage.

5. A phase comparator for determining the amount and direction of phase shift between a reference voltage and a shifting voltage, comprising, in combination, means for deriving from said voltages a first effect proportional to the arithmetic sum of said voltages, means for deriving from said voltages a second effect proportional to the vector sum of said voltages, and means for comparing said effects and producing a third effect proportional to the phase angle between said voltages and differing with lag and lead of the shifting voltage with respect to the reference voltage.

6. A phase comparator for determining the magnitude and direction of phase shift between a reference voltage and a shifting voltage, comprising, in combination, means for producing a first effect proportional to the arithmetic sum of said voltages, means for producing a second effect proportional to the vector sum of said voltages with one of said voltages displaced 90° in phase, and means for comparing said first and second effects to produce a third effect proportional to the phase angle between said voltages and distinguishing between lag and lead of the shifting voltage with respect to the reference voltage.

7. A phase comparator for determining the magnitude and direction of phase shift between a reference voltage and a shifting voltage, comprising, in combination, means for producing from said voltages a voltage which is the vector sum of said voltages, and means for producing, from one of the voltages to be compared and said vector sum voltage, a second voltage which is proportional to the phase angle between said voltages.

8. The combination claimed in claim 7, in which said second voltage is positive or negative depending on whether the shifting voltage lags or leads the reference voltage.

9. A phase comparator for producing a voltage proportional to the phase angle between a reference voltage and a shifting voltage, comprising, in combination, means for producing from said voltages a first voltage proportional to the arithmetic sum of said voltages, means for producing from said voltages a second voltage proportional to the vector sum of said voltages, and means for combining said first and second voltages to produce a third voltage proportional to the phase angle between the reference voltage and the shifting voltage.

10. A phase comparator for producing a voltage proportional to the phase angle between a reference voltage and a shifting voltage, comprising, in combination, a first rectifier, means for supplying to said rectifier one of the voltages to be compared, a second rectifier, means for supplying to said second rectifier the other of the voltages to be compared, means for combining the outputs of said rectifiers, a third rectifier, means for supplying to said third rectifier the vector sum of said voltages to be compared, and means for comparing the rectified output of said third rectifier with the combined outputs of said first and second rectifiers.

11. A phase comparator comprising, in combination, a first rectifier, means for supplying to said rectifier a voltage having twice the amplitude of one of the voltages to be compared, a second rectifier, means for supplying to said second rectifier the vector sum of the voltages to be compared, and means for comparing the rectified outputs of said rectifiers.

12. A phase comparator for determining the phase angle between a pair of voltages of unequal amplitude, comprising, in combination, an amplifier having automatic gain control, means for supplying to said amplifier the smaller of the voltages to be compared, automatic gain control, means for controlling the amplification of said amplifier to amplify said smaller voltage to equality in amplitude with the larger voltage, means for producing a rectified voltage proportional to the arithmetic sum of said voltages after equalization, means for producing a rectified voltage proportional to the vector sum of said voltages after equalization, and means for comparing said rectified voltages.

13. The combination claimed in claim 12 with a limiter interposed between the output of said amplifier and said rectifier, said limiter being adjusted to limit at or only slightly higher than the amplitude of the larger of the voltages to be compared.

14. A phase comparator comprising, in combination, a first circuit comprising a diode rectifier producing a rectified voltage proportional to the arithmetic sum of the voltages to be compared, a second circuit comprising a diode rectifier producing a rectified voltage proportional to the vector sum of the voltages to be compared, and connections between said first and second circuits arranged to provide the algebraic sum of said rectified voltages.

15. A phase comparator for indicating phase displacement between a reference voltage and a shifting voltage, comprising, in combination, means for producing from one of said voltages a voltage of twice the magnitude of said one voltage, means for rectifying said voltage, means for producing a voltage the vector sum of both said voltages, means for rectifying said vector sum voltage, and means for comparing said rectified voltages to produce an indication of the phase angle between the reference and shifting voltages.

16. A system for maintaining a pair of oscillators in synchronism by application of a signal derived from a comparison of their output voltages, comprising means for deriving from the output voltages of said oscillators a first voltage proportional to the arithmetic sum of said output voltages, means for deriving from the output voltages of said oscillators a second voltage proportional to the vector sum of said output voltages, means for deriving from said first and second voltages a third voltage proportional to the phase angle between said output voltages, and means for applying said third voltage to one of said oscillators as a corrective voltage to restore synchronism between said oscillators.

17. A system for maintaining a pair of oscillators in synchronism by application of a signal derived from a comparison of their output voltages, comprising means for deriving from the output voltages of said oscillators a first voltage proportional to the arithmetic sum of said output voltages, means for deriving from the output voltages of said oscillators a second voltage proportional to the vector sum of said output voltages, means for deriving from said first and second voltages a third voltage proportional to the phase angle between said output voltages, said third voltage additionally indicating whether said first oscillator leads or lags said second oscillator, and means for applying said third voltage to one of said oscillators as a corrective voltage to restore synchronism between said oscillators.

18. A system for maintaining a pair of oscillators in synchronism by application of a signal derived from a comparison of their output voltages, comprising a first rectifier, means for supplying to said rectifier the output from one of said oscillators, a second rectifier, means for supplying to said second rectifier the output voltage from the other of said oscillators, means for combining the outputs of said rectifiers, a third rectifier, means for supplying to said third rectifier the vector sum of the voltages from said pair of oscillators, means for comparing the output from said third rectifier with the combined outputs from said first and second rectifiers and deriving a voltage therefrom, and means for applying said derived voltage to one of said oscillators as a corrective voltage to maintain synchronism between said oscillators.

19. A system for maintaining a pair of oscillators in synchronism by application of a signal derived from a comparison of their output voltages, comprising an amplifier having automatic gain control, means for supplying to said amplifier the smaller one of the output voltages of said pair of oscillators, automatic gain control means for controlling the amplification of said amplifier to amplify said smaller voltage so as to equal in amplitude said larger voltage, means for producing a rectified voltage proportional to the arithmetic sum of said voltages after equalization, means for producing a rectified voltage proportional to the vector sum of said voltages after equalization, means for combining said rectified voltages and deriving therefrom a further voltage, and means for applying said further voltage to one of said oscillators as a corrective voltage to maintain synchronism between said oscillators.

20. A system for maintaining a pair of oscillators in synchronism by application of a signal derived from a comparison of their output voltages, comprising a first circuit having a diode rectifier producing a rectified voltage proportional to the arithmetic sum of the outputs of said pair of oscillators, a second circuit having a diode rectifier producing a rectified voltage proportional to the vector sum of the output voltages of said pair of oscillators, means connected between said first and second circuits to provide a voltage proportional to the algebraic sum of said rectified voltages from said first and second circuits, and means for applying said last-named voltage to one of said oscillators as a corrective voltage to maintain synchronism between said oscillators.

References Cited in the file of this patent
UNITED STATES PATENTS

| | | |
|---|---|---|
| 2,443,189 | Jenkins | June 15, 1948 |
| 2,446,607 | Peterson | Aug. 10, 1948 |
| 2,454,807 | Kennedy | Nov. 30, 1948 |
| 2,517,805 | Spindler | Aug. 8, 1950 |
| 2,525,448 | Clarke | Oct. 10, 1950 |
| 2,703,380 | Fraser | Mar. 1, 1955 |
| 2,774,038 | Stavis | Dec. 11, 1956 |